(12) United States Patent
Lenke et al.

(10) Patent No.: US 12,056,198 B2
(45) Date of Patent: Aug. 6, 2024

(54) METHOD AND APPARATUS FOR ENHANCING A GEOLOCATION DATABASE

(71) Applicant: Cerence Operating Company, Burlington, MA (US)

(72) Inventors: Nils Lenke, Aachen (DE); Mohammad Mehdi Moniri, Aachen (DE); Reimund Emil Schmald, Aachen (DE); Daniel Mario Kindermann, Aachen (DE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 17/555,927

(22) Filed: Dec. 20, 2021

(65) Prior Publication Data

US 2022/0365991 A1  Nov. 17, 2022

Related U.S. Application Data

(63) Continuation of application No. 16/455,255, filed on Jun. 27, 2019, now Pat. No. 11,308,175.

(51) Int. Cl.
*G06F 16/9535* (2019.01)
*G06F 16/23* (2019.01)
(Continued)

(52) U.S. Cl.
CPC ...... *G06F 16/9535* (2019.01); *G06F 16/2379* (2019.01); *G06F 16/29* (2019.01); *G06F 16/9537* (2019.01); *G01C 21/3682* (2013.01)

(58) Field of Classification Search
None
See application file for complete search history.

(56) References Cited

U.S. PATENT DOCUMENTS

| 2009/0005076 A1* | 1/2009 | Forstall | H04W 4/029 345/173 |
| 2010/0038416 A1* | 2/2010 | Canora | G06Q 30/02 235/375 |

(Continued)

FOREIGN PATENT DOCUMENTS

WO  2019030027 A1  2/2019

OTHER PUBLICATIONS

International Search Report and Written Opinion, PCT Application No. PCT/US2020/037724, mailed Sep. 15, 2020 (11 pages).

*Primary Examiner* — Christopher J Raab
(74) *Attorney, Agent, or Firm* — Occhiuti & Rohlicek LLP

(57) ABSTRACT

While current voice assistants can respond to voice requests, creating smarter assistants that leverage location, past requests, and user data to enhance responses to future requests and to provide robust data about locations is desirable. A method for enhancing a geolocation database ("database") associates a user-initiated triggering event with a location in a database by sensing user position and orientation within the vehicle and a position and orientation of the vehicle. The triggering event is detected by sensors arranged within a vehicle with respect to the user. The method determines a point of interest ("POI") near the location based on the user-initiated triggering event. The method, responsive to the user-initiated triggering event, updates the database based on information related to the user-initiated triggering event at an entry of the database associated with the POI. The database and voice assistants can leverage the enhanced data about the POI for future requests.

34 Claims, 8 Drawing Sheets

(51) Int. Cl.
   *G06F 16/29* (2019.01)
   *G06F 16/9537* (2019.01)
   *G01C 21/36* (2006.01)

(56) References Cited

U.S. PATENT DOCUMENTS

| | | | |
|---|---|---|---|
| 2014/0301645 A1* | 10/2014 | Mattila | G01C 21/3811 |
| | | | 382/182 |
| 2014/0361973 A1* | 12/2014 | Raux | G06F 3/013 |
| | | | 715/863 |
| 2014/0372022 A1* | 12/2014 | Witmer | H04W 4/024 |
| | | | 701/423 |
| 2015/0127576 A1* | 5/2015 | Grol-Prokopczyk | G06Q 30/0282 |
| | | | 705/347 |
| 2015/0276423 A1* | 10/2015 | McIlhany | G01C 21/3682 |
| | | | 701/425 |
| 2019/0050645 A1* | 2/2019 | Hentz | G06V 20/20 |
| 2020/0020001 A1* | 1/2020 | Singh | H04W 4/021 |
| 2020/0410019 A1* | 12/2020 | Lenke | G06F 16/9535 |

* cited by examiner

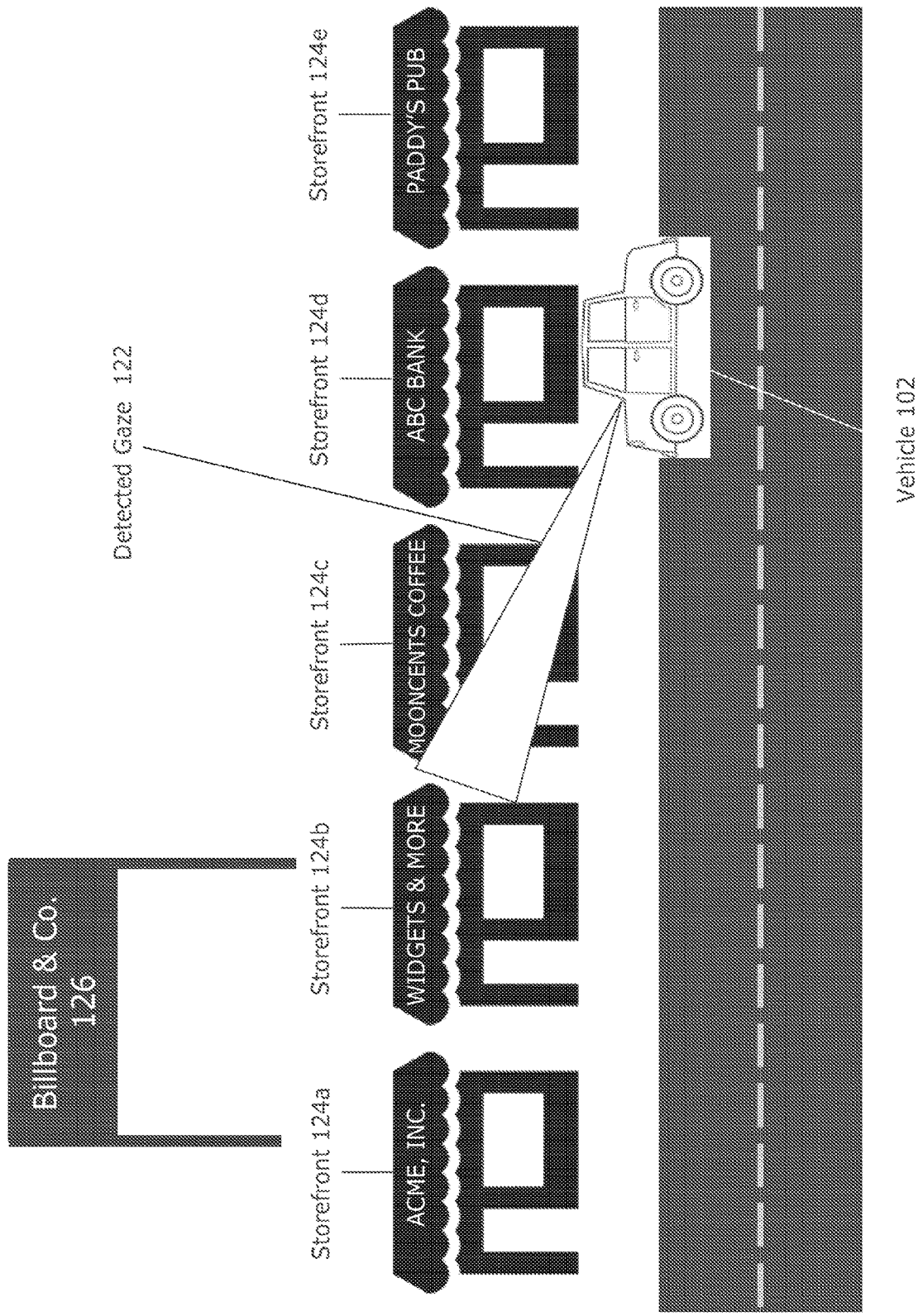

METHOD AND APPARATUS FOR ENHANCING A GEOLOCATION DATABASE

CROSS-REFERENCE TO RELATED APPLICATIONS

This application is a continuation of U.S. application Ser. No. 16/455,255, filed Jun. 27, 2019, the content of which is incorporated herein by reference.

BACKGROUND

Voice-based computer-implemented assistants currently exist in many consumer smartphones, and many vehicles either are equipped with an independent voice-based assistant, or connect to the built-in voice-based assistant of the smartphone. These voice-based assistants can record a voice request of the user, process the request with natural language understanding, and provide a response, such as initiating a phone call or transcribing and sending a text message. Smartphone voice assistants can further perform Internet searches, launch applications, and launch certain tasks allowed by the voice assistant.

SUMMARY

In an embodiment, a computer-implemented method for enhancing a geolocation database includes associating a user-initiated triggering event with a location in a geolocation database by sensing a position and orientation (or alignment) of the user within the transportation vehicle and a position and orientation of the transportation vehicle. The triggering event is detected by one or more sensors arranged within a transportation vehicle with respect to the user. The method further includes determining a point of interest, the point of interest being from among multiple representations of points of interest stored in a geolocation database near the location based on the user-initiated triggering event. The method further includes, responsive to the user-initiated triggering event, updating the geolocation database based on information related to the user-initiated triggering event at the entry of the geolocation database associated with the point of interest.

In an embodiment, the method further includes detecting the user-initiated triggering event by the transportation vehicle by detecting a user emotion, a user gaze, a user query, a user visit to the location, or user background speech. In a further embodiment, the method includes, responsive to detecting the user-initiated triggering event by detecting the user visit to the location, detecting a completion of the user visit and requesting user feedback about the point of interest after the user visit. Updating the geolocation database can include adding the user's feedback to the entry. In a further embodiment, the method includes correlating a direction of the user gaze with the point of interest near the location, and updating an entry of the geolocation database by adding an indication that the user viewed the point of interest. In yet another embodiment, the method includes associating an emotional category based on the detected user background speech with the location. In an even further embodiment, the method includes associating the user query with the point of interest.

In an embodiment, the method includes recommending a point of interest using the updated geolocation database.

In an embodiment, the method further includes recommending a route to the user using the updated location database. In a further embodiment, the method includes associating a plurality of user-initiated triggering events, detected by a plurality of other transportation vehicles, with respective locations in a geolocation database. The method further includes updating the geolocation database includes updating real-time locations of objects associated with the plurality of other transportation vehicles. In yet a further embodiment, the method includes recommending the route to the user further includes querying the updated location database in real-time and determining velocities of objects associated with the plurality of other transportation vehicles reported in the geolocation database.

In an embodiment, a system for enhancing a geolocation database includes one or more sensors arranged within a transportation vehicle with respect to a user of the transportation vehicle. The system further includes a processor and a memory with instructions stored thereon, such that when the instructions are executed by the processor, the processor performs the following actions. The processor associates a user-initiated triggering event, detected by the one or more sensors, with a representation of a geographical location in an entry of a geolocation database by sensing a position and orientation of the user within the transportation vehicle and a position and orientation of the transportation vehicle. The processor determines a point of interest, the point of interest being from among multiple representations of points of interest stored in the geolocation database near the location based on the user-initiated triggering event. The processor, responsive to the user-initiated triggering event, updates the geolocation database based on information related to the user-initiated triggering event at the entry of the geolocation database associated with the point of interest.

In an embodiment, keys to the geolocation database can include the user-initiated triggering event, a location, a position of the user, an orientation of the user, a combined position and orientation of a user or multiple users.

In an embodiment, a subsequent user-initiated triggering event further updates the geolocation database by appending information related to the subsequent user-initiated triggering event to the entry of the geolocation database.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1B is a diagram illustrating an example embodiment of the present disclosure.

DETAILED DESCRIPTION

A description of example embodiments follows.

With widespread adoption of voice-based assistants in phones, vehicles, and other devices, people increasingly speak with these voice-based assistants. While current voice assistants rely on geolocation for some queries, both voice-based assistants and geolocation databases can be improved by better leveraging available information from user such as the user's speech tone and content, the user's emotional state, and even the direction the user is looking in conjunction with the user's geolocation. In an embodiment, the present disclosure describes computer-implemented methods and systems for using voice and other vehicle sensors to learn data about the surrounding environment.

Figure 1A:
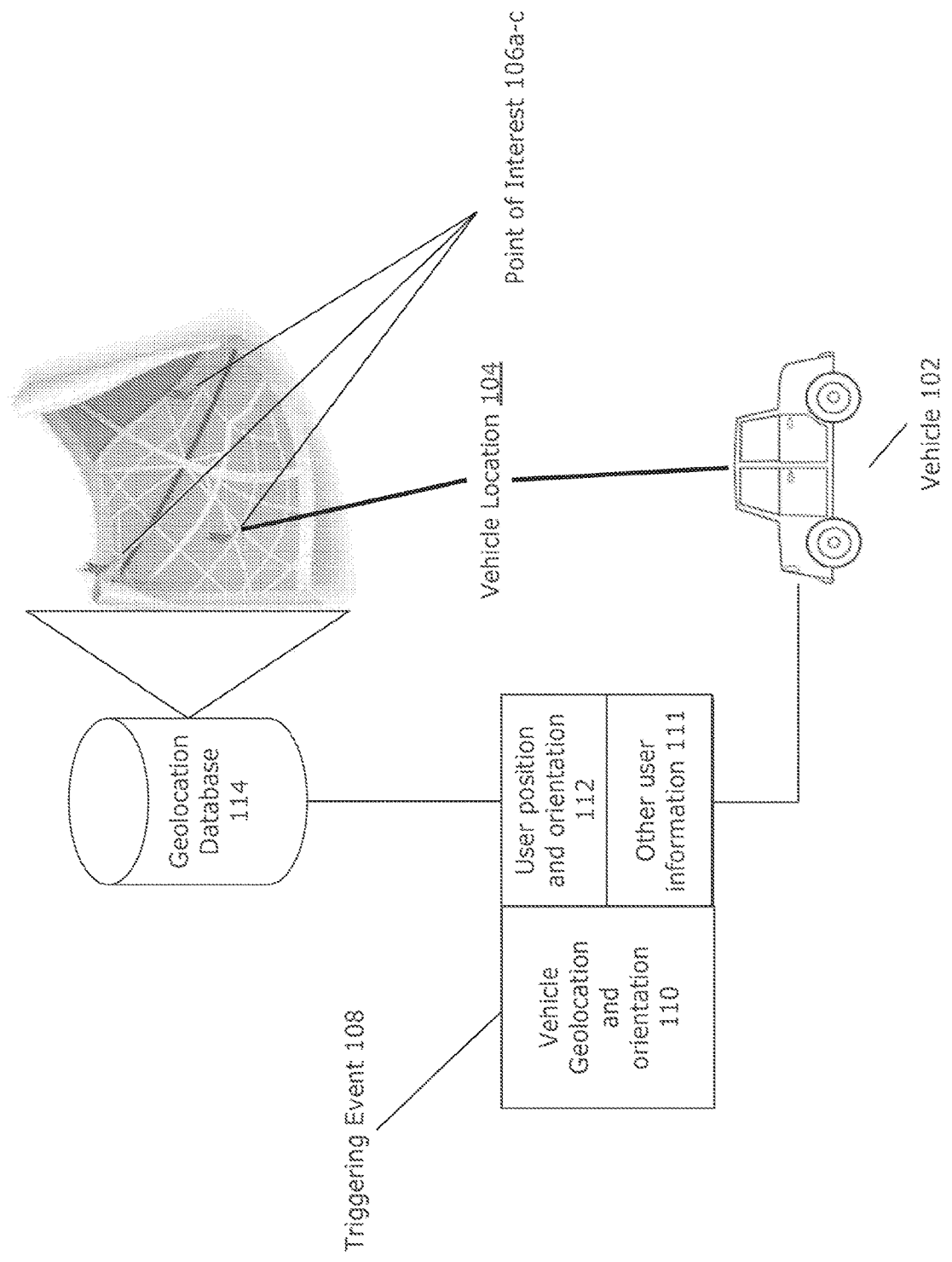
FIG. 1A is a high-level diagram illustrating an embodiment of the present disclosure.

FIG. 1A is a high-level diagram 100 illustrating an embodiment of the present disclosure. A vehicle 102 is configured to detect a triggering event 108 that is reported to a geolocation database 114. The triggering event 108 includes a vehicle geolocation and orientation 110, a user position and orientation 112, and other user information 111. The triggering event 108 is a detected change related to the vehicle, its occupants, or both, that when recorded, can enhance a geolocation database. Triggering events can include a voice query, a voice query with emotion, a user's gaze, a user's gesture, a user's visual emotion, vehicle speed and orientation information, and detected locations, speeds, orientation, and vectors of other vehicles.

The vehicle geolocation and orientation 110 first includes the vehicle's location as determined by a global positioning system (GPS) or other location determining system (e.g., landmark detection, inertial location detection, etc.). The orientation of the vehicle can be determined by, for example, a history of vehicle locations, an inertial measurement unit (IMU), a compass, or other methods. The user position and orientation 112 further measures the user's position in the vehicle and the user's orientation relative to the direction of the vehicle by using cameras, (e.g., traditional cameras or stereo vision cameras). In an embodiment, a location and orientation enabled camera can be used for gaze detection to see to what points of interest people pay attention, either inside or outside the vehicle. In an embodiment, gaze information can be applied to a nearby location. Gaze can be determined from user position and orientation 112 and vehicle geolocation and orientation 110 of the triggering event 108. In embodiments, the user position can be expressed as a position within the car, such as a seat within the car, or even a specific planar (e.g., X-Y) position or three-dimensional position (e.g., X-Y-Z). The orientation information can express a tilt of the user's body and head. Gaze information can be combined with such orientation information to provide a line of sight angle for each particular passenger relative to the vehicle. Combining such an angle and position of the user within the car with the vehicle geolocation and orientation 110 and a 2-D or 3-D model of the environment can be used to determine the object or objects at which that the user is looking.

When interacting with voice-based assistants, users provide information about their thinking and emotional state. Users also provide information on the state of the world around them, such as points of interest (POIs), objects, landmarks, or traffic near the user or user's vehicle 102. Such information can be included as other user information 111 of a triggering event 108. For example, when a user driving a vehicle asks the voice-based assistant for restaurants near the vehicle, the voice-based assistant presents a list of restaurant options. When the user then picks one option out of the list, this selection contains implicit information about the user's preference of his or her selection over the other options in the list. The user can further provide an explicit review of the restaurant after the visit and make explicit statements about its quality, etc. The voice-based assistant can proactively invite the user to provide such a review. A point of interest is a location that a user may find useful or a geolocation database may highlight. A non-limiting list of examples of points of interest are a business (e.g., gas station, restaurant, or company building), a residential building, a landmark, a road, highway, intersection, a construction area, a natural landscape (e.g., the field with the yellow flowers), or a geographic landmark (e.g., mountain, river, trail, etc.).

Further, emotion detection technology can detect emotions from voice signals, from visual information (e.g., pictures or video) of a user's face, or from other sensor data. Emotions can be detected from voice signals or speech based on the manner (e.g., tone, volume, words used) the recorded user(s) speak. A camera can detect emotions from recorded facial expressions. If the Applicant's system and method determines a user emotion, the system can apply the emotion to a relevant nearby location (e.g., landmark, point of interest, or GPS location/range). Emotion information can be included as other user information 111 of the triggering event 108 as well.

In the embodiment where a user is in a vehicle, the collected information about the user can be linked to objects near the vehicle, because vehicle locations can be known via global positioning systems (GPS) and navigation systems. The vehicle can further be connected to the web via direct connections or via tethering with a user's cell phone. Therefore, a geo-location based database of an area can be enhanced with the information received from one or more vehicles/users. The improved and enhanced geo-location model can then be used to provide a better service to the group of users. In another example, collecting information about drivers interacting with the vehicle infotainment system more often at certain road passages may indicate that those road passages have less attractions to view. In another example, a user adjusting vehicle or other device controls may indicate red traffic lights with a long waiting duration.

In an embodiment, a voice assistant of the vehicle 102 determines that the driver has just visited a point of interest (POI) such as a restaurant (e.g. restaurant), because the user had previously enquired about that POI, and the vehicle was parked in the vicinity (e.g., a variable radius based on population density/detected traffic/parking availability) of the POI for an amount of time over a threshold (e.g., a predicted time to visit the POI). Such a sequence can be a triggering event 108. The voice assistant of the vehicle proactively starts a conversation asking for a review and further information about that POI. The voice assistant can either ask for a structured list of fields (e.g., a form filling dialog) for fields such as overall impression, quality of food, service, etc., and translate the answers into an objective rating (e.g., 1-5 stars). The voice assistant can also ask for a free form description of the experience, and translate this into a sentiment using sentient detection from language (e.g., based on content). The voice assistant can also can store the entire description as text or as a voice file to be read out/played back to others as a review. The information of the survey can be included as other user information 111 of the triggering event 108.

The provided information (e.g., other user information 111) is forwarded to the enhanced geo-location database via the data connection and is linked to the POI in the enhanced geolocation database. The enhanced geo-location database aggregates rating information. Individual comments (e.g., text comments or voice filed comments) are stored as is, and retrieved for other users (e.g., by most recent, most helpful, etc.).

If a user asks a question about a point of interest, the system can use this question/query as a factor that the POI is interesting to the user. The system receives each query as other user information 111 of a triggering event. The system can aggregate these queries from the triggering events 108 in the geo-location database 114 in the cloud, and generate ranks of POIs 106a-c by comparing the number of questions/queries asked about them.

In an embodiment, all the information collected and aggregated by the methods described above can then be used to assist drivers and users by (a) recommending of POIs 106a-c based on ratings generated from sentiments, (b) recommending interesting routes or routes going through places that generate positive feelings and avoid stressful places, and (c) warn of traffic problems and inform about interesting new features reported by others.

The triggering even 108 is stored in a geolocation database 114 and is indexed by the vehicle location 104. In such a manner, other information included with the triggering event 108 108 can be associated with the vehicle location 104. For example, a user's mood, gaze location, user's identification, content of user's speech, or other user information 111 can be associated with the geolocation in the database 114. This improves traditional geolocation databases by associating locations, in real time, with information that is not typically gathered with geolocation tags.

Typical geolocation databases may store locations of points of interest, specific types of incident reports, and reviews of points of interest. Such databases typically are not supplemented with real time data representing user's positions in a vehicle, physical orientation, gaze information, and mood information as the user travels through different locations. Such data, especially in the aggregate, can be particularly valuable when stored in a geolocation database, and can improve the user experience.

In an embodiment, Applicant's enhanced geolocation database is enabled to provide multiple simultaneous functions. The enhanced geolocation database is a database system that provides enhanced metrics associated with geographical locations and points of interest. Such a database allows for access of the database via lookups of locations and points of interest as keys to view enhanced metrics, but also allows looking up metrics to determine locations matching those metrics. Another application of the present disclosure is customizing and retrieving a customized database (e.g., the enhanced database) by storying and performing retrieval based on user-initiated triggering event information. Applicant's enhanced geolocation database solves the technical problem of gathering metrics keyed to geolocation in real time, and allow for access of the updated geolocation database in real time as well.

A person having ordinary skill in the art can further recognize that metrics may be gathered from the transportation vehicle after certain triggering events to reduce the amount of data being transferred. For example, the transportation vehicle can send metrics when the user's pose (e.g., position and orientation) meets certain criteria (e.g., an orientation greater than 25 degrees from center). By filtering triggering events at the transportation vehicle, the traffic to the geolocation database can be reduced and the performance enhanced. A person having ordinary skill in the art can apply the same filtering principles to gaze detection, emotion detection, vehicle speed detection, and other concepts disclosed herein to further filter traffic and improve the performance of the database.

FIG. 1B is a diagram 120 illustrating an example embodiment of the present disclosure. Gaze detection can determine which objects and POIs outside the vehicle attract the attention of driver and passengers. The system sends information about a detected gaze 122 to the cloud where it is aggregated in a geolocation database (e.g., the geolocation database of FIG. 1A) and processed. The system can generate a baseline model of directions relative to the vehicle where drivers and passengers typically look while driving through a generic area (e.g., more often to the front than 90 degrees to the right) or it employs historical data for the area in question and calculates whether the gaze events in a certain period (e.g., last day or week) deviate from that model or historical data. The system can then attribute this to a certain object (e.g., a storefront 124a-e, a new billboard 126, or PR campaign displayed on the billboard 126). Gaze detection can further triangulate the object of the user's gaze based on the GPS location of the vehicle, direction of the vehicle, and the direction of the user's detected gaze.

When the voice assistant of the vehicle determines that the driver is visiting a POI (e.g. restaurant), the assistant compares emotion detection results from driver or passenger utterances on any topic, based on manner of speaking, prior to and after the visit of the POI and determines a change in mood or emotion, either negative or positive (e.g., by averaging the results over a configurable time span. In other words, the system can calculate the change in moods of occupants of the car before and after a visit to a POI.

In another embodiment, the change of emotion can be detected based on facial expressions. The change in emotion is recorded in the enhanced geo-location database via the vehicle's data connection as an indicator of positive or negative experience at the POI. The enhanced geo-location database aggregates several emotional feedback changes in a profile of the POI, for example by comparing the ratio of positive and negative ratings to the average ratio of positive and negative changes over all POIs, or generating a rating metric (e.g., 1-5 stars) based on the aggregated emotional change. By using large data sets, the enhanced geo-location database can be used to detect emerging trends, and random fluctuations of the mood of single drivers at isolated events can be statistically lessened.

In one embodiment, the vehicle 102 monitors a user's position and gaze information, and determines detected gaze 122. Combined with GPS information, the system identifies the user's attention being given to storefront 124b of all of the storefronts 124a-e in a vicinity of the vehicle 102. The system can store this information in the geolocation database (shown in FIG. 1A). In other embodiments, the system can estimate the POI that the user visited after parking the vehicle 102 and estimate a change in mood or attitude based on emotions detected by visual or audio means.

Figure 2:
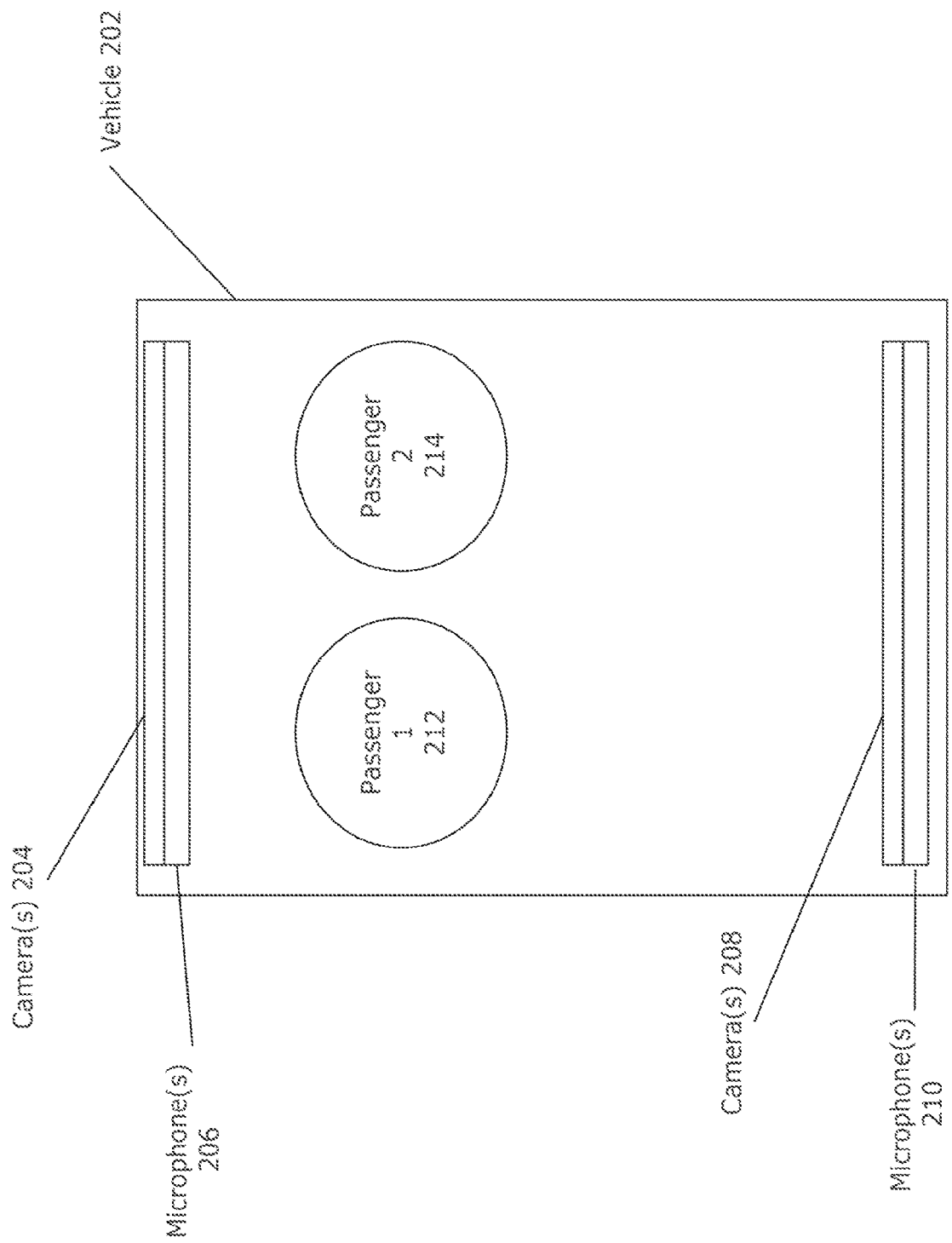
FIG. 2 is a diagram illustrating an example embodiment of a vehicle used in embodiments of the present disclosure.

FIG. 2 is a diagram 200 illustrating an example embodiment of a vehicle 202 used in embodiments of the present disclosure. When headpose or gaze detection information is tracked concurrently with the speech data, emotions detected in speech or visually can be attributed to POIs. Vehicle 202 includes cameras 204 and 208 (e.g., regular cameras or stereo vision cameras) and microphone array 206 and 210. A person having ordinary skill in the art can recognize that the cameras 204 and 208 can be placed in various locations within the vehicle 202, and do not necessarily have to be placed as shown in FIG. 2. Similarly, a person having ordinary skill in the art can recognize that the microphones 206 and 210 can be placed in various locations within the vehicle 202, and do not necessarily have to be placed as shown in FIG. 2. A person having ordinary skill in the art can further recognize that in another embodiment (not shown) there can be only one camera 204 or 208, or only one microphone 206 and 210. A person having ordinary skill in the art can further recognize that more than two cameras 204 or 208 or microphones 206 or 210 can be positioned within the vehicle (e.g., an array of cameras or microphones, respectively).

Passenger 1 212 and Passenger 2 214 are seated in respective positions within the vehicle 202. The cameras 204 and 204 are configured to monitor the user position, orientation, and user gaze of Passenger 1 212 and Passenger 2 214, respectively. Given the user position, orientation, and gaze of each Passenger 212 and 214, a system can calculate the direction of the gaze relative to the vehicle. Combining that information with location information from a GPS and a 2D or 3D model of the environment can provide an estimate at which point of interest the user is gazing. In other embodiments, the user's mood can be detected visually (e.g., image based emotion recognition) or audibly (e.g., mood recognition of audio recordings, analysis of content of user's speech for mood).

Figure 3:
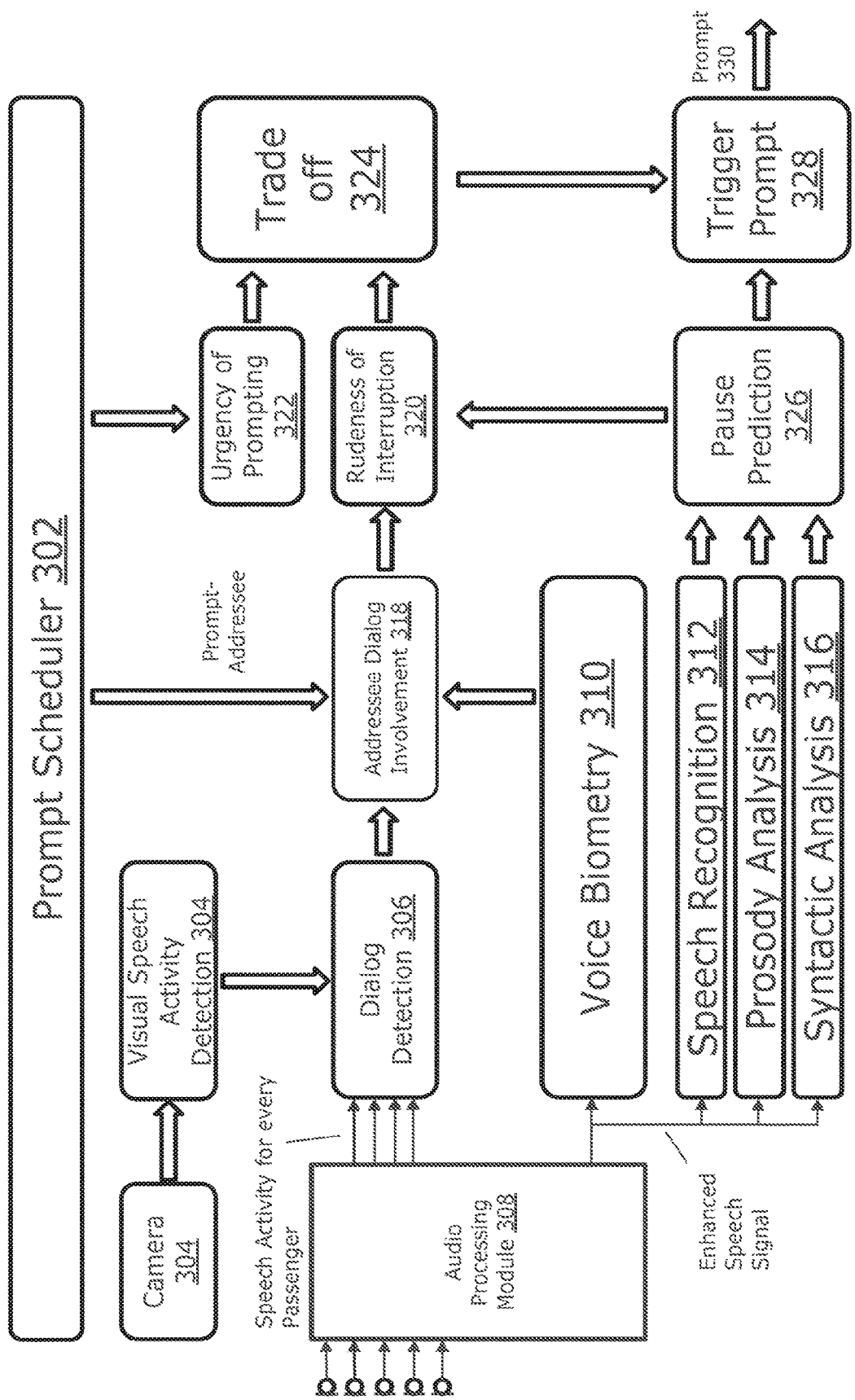
FIG. 3 is a block diagram illustrating an example embodiment of the present disclosure.

FIG. 3 is a block diagram 300 illustrating an example embodiment of the present disclosure. A prompt scheduler module 302 is configured to schedule prompts to the user based on detected information in the vehicle in accordance with the modules shown my diagram 300. The supplementary modules described below assist the prompt scheduler 302 in determining when to issue a prompt and which prompt to issue.

An audio processing module 308 is configured to detect voice activity and isolate the voice activity into different source speakers (e.g., human users) based on where the speakers are in the vehicle. The audio processing module 308 records audio from an array of in-vehicle microphones, and the audio processing module 308 can further derive a location of the speaker based on the known location of each microphone of the array and the raw audio each receives (e.g., by time distance of arrival (TDOA) analysis or other methods).

If speech data is from different people in the vehicle, and voice biometrics may be used to differentiate between different speakers. The voice biometrics can factor one or more categories of users, such as gender and age, which can further generate heatmaps that can be filtered based on these categories. For example, POIs that may be interesting to children may not be interesting to adults, etc. A person having ordinary skill in the art can recognize other demographic splits can take advantage of the division of dialog from voice biometrics. A generated heatmap, discussed further in relation to FIG. 5, can reflect differences in emotions across different demographics and cross sections of the population.

In relation to FIG. 3, a visual speech activity detection module 304 can be configured to detect a passenger having speech activity based on video from a camera 304 or array of cameras. The output of the visual speech activity detection 304 can be an identification of a passenger within the vehicle. The output of the visual speech activity detection module 304 can further be speech detected by lip movements, or detection of tone and emotion of a given segment of speech.

A dialog detection module 306 can be configured to output a dialog between passengers of the vehicle based on the output of the audio processing module 308 and the visual speech activity detection 304.

The audio processing module 308 can further be configured to enhance the audio with known methods and provide an enhanced audio signal. Several modules take advantage of the enhanced speech signal. For example, a voice biometry module 310 determines an identity of each respective speaker from the enhanced speech signal. In addition, a speech recognition module 312 performs automated speech recognition (ASR) or natural language understanding (NLU) to convert the speech signal to a textual output. A prosody analysis module 314 is configured to determine and output a pattern of rhythm of the dialog in the enhanced speech signal. A syntactic analysis module 316 is configured to analyze the dialog and output the syntax of the dialog. In an embodiment, the syntactic analysis module 316 may receive output of the speech recognition module 312 in addition to or instead of the enhanced speech signal.

The textual output of the speech recognition module 312, the pattern of rhythm of dialog output by the prosody analysis 314, and the syntax output by the syntactic analysis 316 are forwarded to a pause prediction module 326, which generates a prediction of when the passenger conversation is expected to pause.

An addressee dialogue involvement module determines the degree to which each particular passengers is involved in the conversation based on the dialog detection module 306 output and the voice biometry module 310 output. The voice biometry module output 310 identifies which speaker has uttered each portion of dialogue. Therefore, the addressee dialog involvement module 318 can determine the involvement of each speaker based on their biometrically identified contributions to the conversation.

A rudeness of interruption module 320 can determine, from pause predictions of a dialogue and addressee dialog involvement 318 whether an interruption was rude. For example, if an interruption occurred in the dialog after a ¼ second pause, but the pause prediction module 326 predicted a 1.5 second pause, module 320 determines the interruption is rude. On the other hand, should the pause prediction module 326 predict a 2 second pause, and a 3 second pause occurs in the dialog, the module 320 determines the interruption is not rude. In embodiments, the module 320 can determine a rudeness factor on a rudeness scale, and can also generate a binary output of rudeness (e.g., rude and not rude).

A trade off module 324 compares an urgency of prompting 322 generated by the prompt scheduler to the output of the rudeness of interruption module 320. If the urgency of prompting 322 outweighs the rudeness of interruption 320, the trade off module 324 can signal to a trigger prompt module 328 to issue a prompt. The trigger prompt 328 can issue the prompt when the pause prediction module 326 indicates that a predicted pause will allow time for the prompt to be issued to the user.

The pause prediction can be used by a prompt triggering module 328 to trigger a prompt 330 to the user (e.g., over the voice interface of the vehicle or other user device). The pause prediction from the pause prediction module 326 can further be used to determine a rudeness of interruption by a rudeness module 320.

Figure 4:
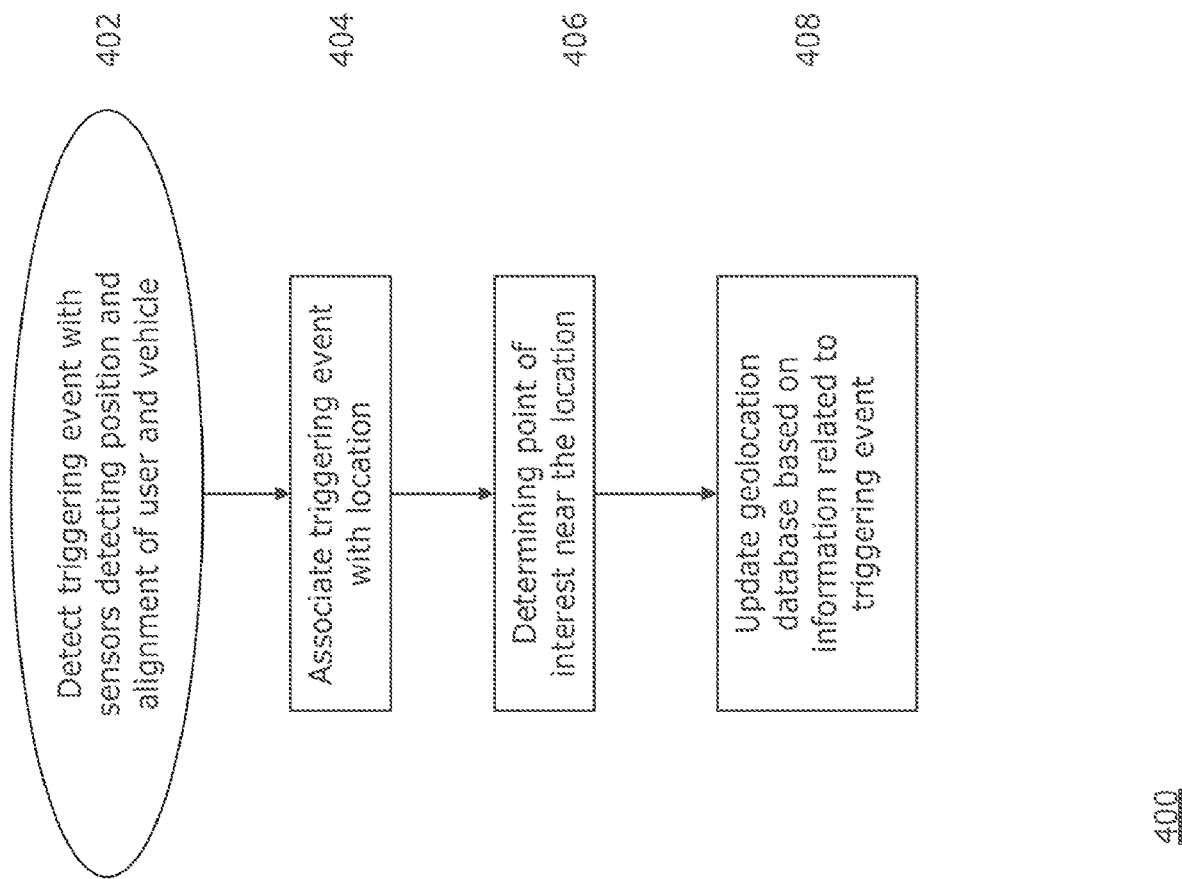
FIG. 4 is a flow diagram illustrating an example embodiment of a process employed by the present disclosure.

FIG. 4 is a flow diagram 400 illustrating an example embodiment of a process employed by the present disclosure. The process detects a triggering event with sensors (e.g., cameras, GPS etc.) detecting position and orientation of user and a vehicle. Then, the process associates the triggering event with a location (e.g., detected by the GPS)

(404). Then, the process determines a point of interest near the location (406). The point of interest can include a storefront, landmark, address, intersection, road, or other feature of a map. Then, the method updates a geolocation database based on information related to the triggering event (408).

Figure 5:
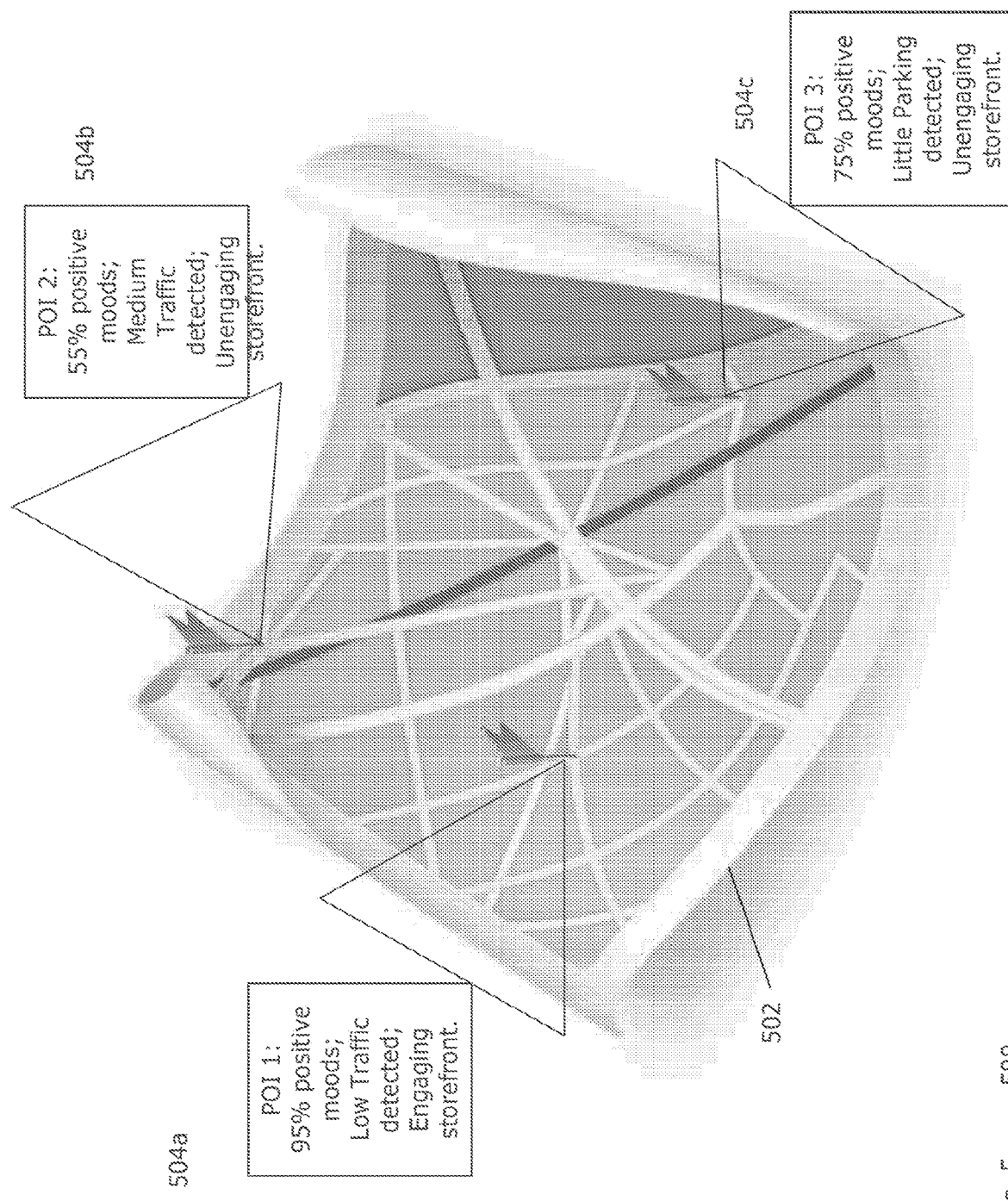
FIG. 5 is a diagram illustrating a heat map generated by an example embodiment of the present disclosure.

FIG. 5 is a diagram 500 illustrating a heat map 502 generated by an example embodiment of the present disclosure.

Speech data can be temporarily stored in and processed by a cloud server to generate a speech based "heat map" for certain emotions. For that purpose, all speech utterances that are associated with a geolocation the audio metadata are processed with emotion detection methods. "Hits" for certain emotions (e.g., stress, anger, joy) become associated with the location, time, other variable (e.g., weather), or combination of variables. With many such data points, the system can determine the ratio of each detected emotion compared to other detected emotions in that location, and generate a color-coded map illustrating a frequency of each emotion per location. This can produce several heatmaps isolating each, for example. Furthermore, a combined or differential heatmap can be generated that displays differences between emotions at certain points. For example, in some places all emptions may be increased while in other locations only select locations may increase, which may be more significant.

The assistant can allow the user to pro-actively report about relevant events or conditions at a given location, like accidents, road blocks, adverse weather conditions, available parking spaces, newly opened restaurants or shops, and the assistant can translate this into relevant updates for either a short-term model (e.g., traffic situation) or a long-term database of POIs (e.g., new shops), both located in the cloud. The assistant, by collecting this information, complements systems that collect such information through sensors and provides an advantage when a semantic interpretation by the user's speech creates information of a higher value compared to that generated by sensors.

Using the collected data over a short-term time period, the extracted information can be distributed live to other traffic participants, regardless of whether the receiving vehicle includes the above described sensors or functionality. This feature contributes to a live city heat map over several layers and features. In this case, for example if several vehicles with pedestrian detection, detect crossing pedestrian on a specific geo-location of the city. This information is forwarded to the vehicles who lack this sensor or functionality, however, possess a GPS device for positioning. This behavior can be expanded to cover various heat map layers described above. When the "heat-level" reaches a certain grade, the information is passed to traffic users who need it most. For instance, at an intersection, if a vehicle detects an object reaching the intersection at a high rate of speed, it can send a notification to other traffic participants who may not see the fast-moving object due to some occlusion.

The above-mentioned features can detect live information for a region having all of the human emotions, driver's focus and live traffic hazards in an anonymous way. This information can be used by other traffic participant or the government to look and regulate depending on their needs and the urgency or frequency of the hazards and events.

In this example, the heat map 502 illustrates three points of interests (POIs), POI 1 504a, POI 2 504b, and POI 3 504c. Each POI 504a-c is associated with data collected at the respective locations. For example, each POI 504a-c can be associated with mood data, traffic data, parking data, and information on engaging signs/storefronts. POI 1 504a is associated with 95% positive moods, has low traffic detected, and an engaging storefront. POI 2 504b is associated with 55% positive moods, has medium traffic detected, and an unengaging storefront. POI 3 is associated with 75% positive moods, low available parking, and an unengaging storefront.

From this data, a user can select a metric about the map, such as positive moods, and see a heatmap overlay on the map of where the moods are most positive and most negative. For example, areas of map with the most positive moods can be shaded green, and areas of the map with the most negative moods can be shaded red. Intermediary moods can be shaded colors along a red-green color scale. In other embodiments, engaging or unengaging storefronts can be selected and highlighted by a user. In a further embodiment, low, medium, and high traffic can be overlaid on the roads of a map and displayed in colors indicating the traffic letter.

Time of day and time of year (e.g., date, season, etc.) may also be available and can be used to generate heatmaps of emotions that have those factors as a variable. Time of day may have impact on lighting conditions and on people's interests, similarly for time of year. Similarly, weather conditions can also factor into generation of the heatmap, where snow, ice, or rain can affect visibility, traffic, and accessibility of POIs. For example, ski resorts are visited heavily in winter months, but rarely in the summer. The system could filter for the most useful data in such a scenario, such as just looking at the emotional heatmap of a ski resort only in the winter months.

Figure 6:
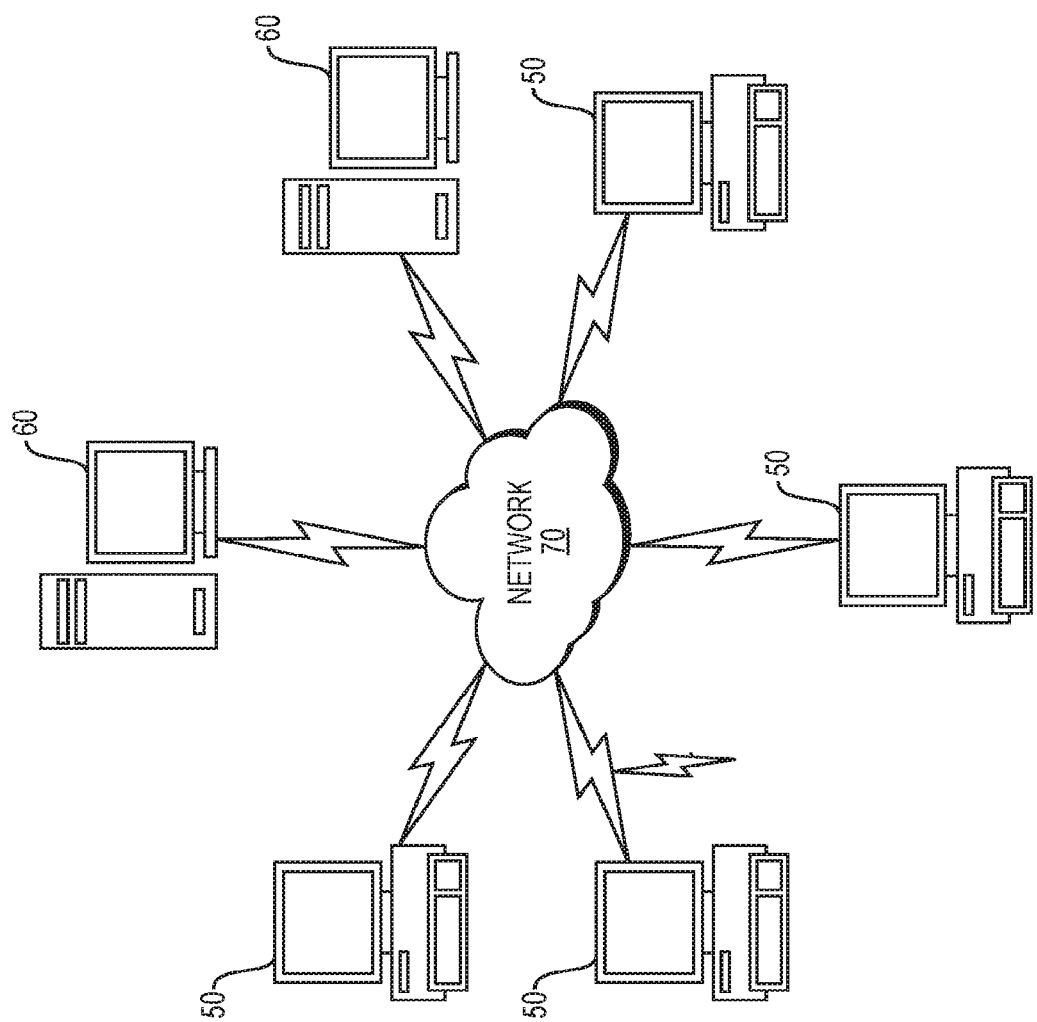
FIG. 6 illustrates a computer network or similar digital processing environment in which embodiments of the present invention may be implemented.

FIG. 6 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 7:
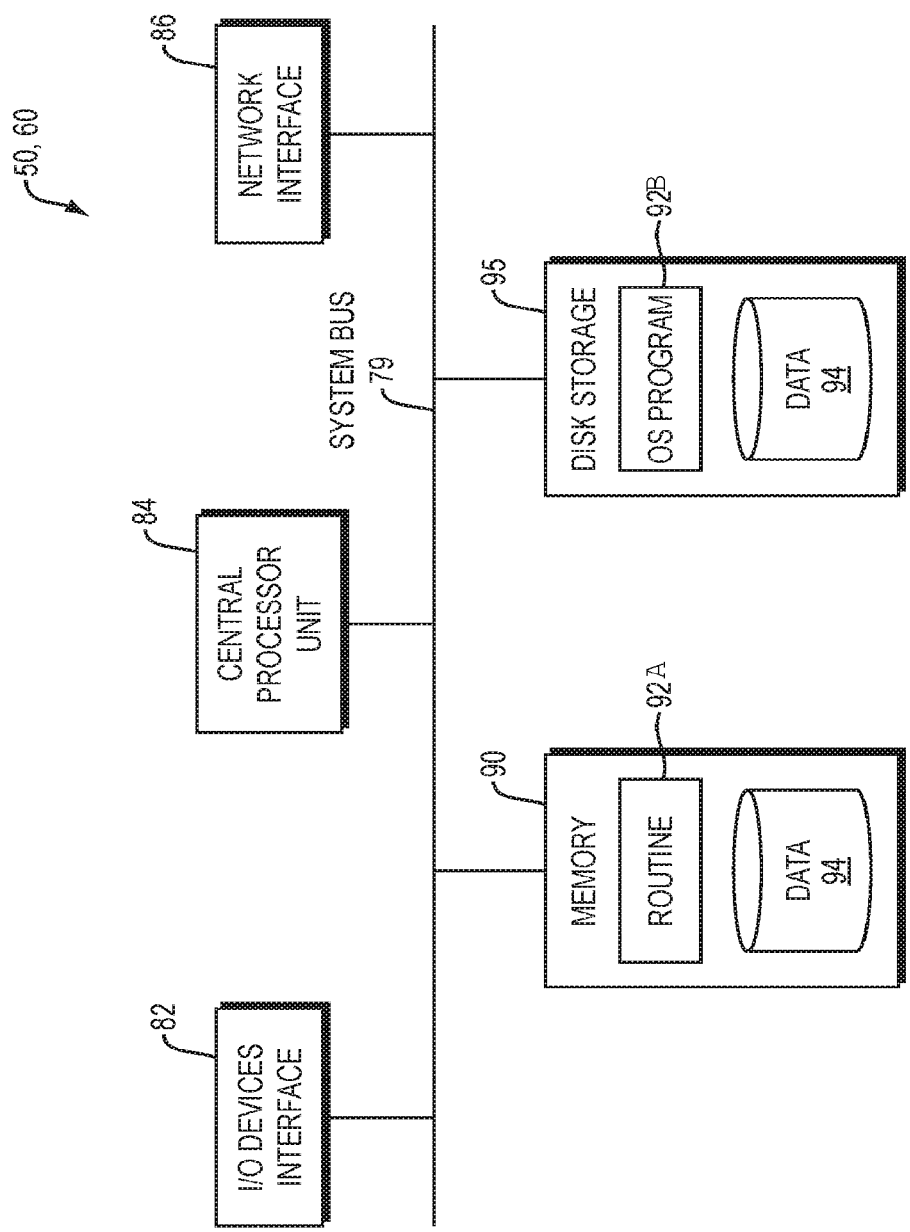
FIG. 7 is a diagram of an example internal structure of a computer (e.g., client processor/device or server computers) in the computer system of FIG. 6.

FIG. 7 is a diagram of an example internal structure of a computer (e.g., client processor/device 50 or server computers 60) in the computer system of FIG. 6. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 6). Memory 90 provides volatile storage for computer software instructions 92 and data 94 used to implement an embodiment of the present invention (e.g., prompt scheduler module, audio processing module, visual speech activity detection module, voice biometry module, speech recognition module, prosody analysis module, syntactic analysis module, pause prediction module, rudeness of interruption module, trade off module, trigger prompt module, and gaze detection module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

While example embodiments have been particularly shown and described, it will be understood by those skilled in the art that various changes in form and details may be made therein without departing from the scope of the embodiments encompassed by the appended claims.

What is claimed is:

1. A method comprising
enhancing a geolocation database using a triggering event, wherein said geolocation database comprises entries, each of which corresponds to a point-of-interest from a plurality of points-of-interest,
wherein enhancing said geolocation database using said triggering event comprises:
detecting said triggering event,
sensing a vehicle position, said vehicle position being a position of said vehicle upon detection of said triggering event,
sensing a vehicle orientation, said vehicle orientation being an orientation of said vehicle upon detection of said triggering event,
sensing a user position upon detection of said triggering event,
sensing a user orientation upon detection of said triggering event,
using at least two of said vehicle position, said vehicle orientation, said user position, and said user orientation, associating said triggering event with a particular entry from said geolocation database, said particular entry corresponding to a particular point-of-interest from said plurality of points-of-interest, and
based on said triggering event, updating said particular entry from said geolocation database, whereby information concerning said particular point-of-interest is enhanced based on said triggering event,
wherein enhancing said geolocation database using said triggering event further comprises comparing a ratio of positive to negative ratings for a point-of-interest in said geolocation database to an average ratio of positive to negative ratings averaged over plural points-of-interest in said geolocation database.

2. The method of claim 1, wherein detecting initiation of said triggering event comprises detecting information indicative of a user emotion, said information indicative of said user emotion being indicative of said triggering event having been initiated.

3. The method of claim 1, wherein detecting initiation of said triggering event comprises detecting said initiation based on a direction in which said user's attention has been drawn and a point-of-interest that lies in said direction, said point-of-interest being determined at least in part based on said vehicle position and said vehicle orientation.

4. The method of claim 1, wherein detecting initiation of said triggering event comprises detecting a user query uttered by said user, said user query being indicative of initiation, by said user, of said triggering event.

5. The method of claim 1, wherein detecting initiation of said triggering event comprises detecting an angle and position of said user relative to said vehicle and using said vehicle position and said vehicle orientation, together with a model of an environment in which said vehicle is located, to identify an object at which said user is looking.

6. The method of claim 1, wherein detecting initiation of said triggering event comprises detecting user background speech and wherein said method further comprises using said background speech, said vehicle position, and said vehicle orientation to associate an emotional category with said user.

7. The method of claim 1, further comprising presenting said user with a plurality of points-of-interest drawn from said geolocation database, detecting a user's selection of a point-of-interest from said plurality of points-of-interest, and making an inference based on said user's having selected said selection of said point-of-interest over other points-of-interest in said plurality of points-of-interest.

8. The method of claim 1, wherein said user is one of a plurality of users and wherein enhancing said geolocation database comprises updating said geolocation database based on triggering events initiated by each of said users.

9. The method of claim 1, wherein detecting initiation of said triggering event comprises detecting interaction with an infotainment system of said vehicle and wherein updating said particular entry from said geolocation database comprises updating said particular entry to indicate a paucity of attractions for viewing at said vehicle location.

10. The method of claim 1, wherein detecting initiation of said triggering event comprises detecting that a user has inquired about said particular point-of-interest, said method further comprising detecting that said vehicle has been parked within a predetermined radius of said particular point-of-interest for a duration that exceeds a threshold and causing a voice assistant of said vehicle to solicit, from said user, a review of said particular point-of-interest.

11. The method of claim 1, wherein said user is a first user from a plurality of users that comprises said first user and a second user and wherein updating said particular entry from said geolocation database comprises storing a voice file containing information provided by said user concerning said particular point-of-interest, wherein said method further comprises playing back said voice file for said second user, said second user being in a vehicle that differs from said vehicle.

12. The method of claim 1, wherein updating said particular entry from said geolocation database comprises causing a voice-assistant of said vehicle to ask said user for information for filling a structured list of fields, said method further comprising providing said information for filling said structured list of fields to another user in another vehicle.

13. The method of claim 1, further comprising ranking entries in said geolocation database based on information that results from said triggering event and from information that results from additional triggering events from other users.

14. The method of claim 1, wherein said triggering event is a user-initiated triggering event.

15. The method of claim 1, further comprising associating said triggering event with a particular entry from said geolocation database.

16. The method of claim 1, wherein updating said particular entry from said geolocation database comprises updating a metric keyed to a geolocation in said database.

17. The method of claim 1, wherein updating said particular entry from said geolocation database comprises updating a rating metric keyed to a geolocation in said database.

18. A method comprising enhancing a geolocation database using a triggering event, wherein said geolocation database comprises entries, each of which corresponds to a point-of-interest from a plurality of points-of-interest, wherein enhancing said geolocation database using said triggering event comprises: detecting said triggering event, sensing a vehicle position, said vehicle position being a position of said vehicle upon detection of said triggering event, sensing a vehicle orientation, said vehicle orientation being an orientation of said vehicle upon detection of said triggering event, sensing a user position upon detection of said triggering event, sensing a user orientation upon detection of said triggering event, using at least two of said vehicle position, said vehicle orientation, said user position, and said user orientation, associating said triggering event with a particular entry from said geolocation database, said particular entry corresponding to a particular point-of-interest from said plurality of points-of-interest, and based on said triggering event, updating said particular entry from said geolocation database, whereby information concerning said particular point-of-interest is enhanced based on said triggering event, said method further comprising receiving, from said user, a selection of a metric, and using said geolocation database to generate a heatmap overlay of said metric on a map, wherein generating said heatmap overlay comprises marking different regions of said map to identify different values of said metric.

19. The method of claim 18, wherein detecting initiation of said triggering event comprises detecting user background speech and, based on said user background speech, indicating initiation of said triggering event.

20. The method of claim 18, wherein detecting initiation of said triggering event comprises detecting a gesture made by said user, said gesture being indicative of initiation, by said user, of said triggering event.

21. The method of claim 18, wherein detecting initiation of said triggering event comprises detecting a visit by said user to said particular point-of-interest.

22. The method of claim 18, further comprising, following a user's visit to said particular point-of-interest, causing a voice-based assistant in said vehicle to invite said user to provide a review of said particular point-of-interest for inclusion in said geolocation database, wherein updating said particular entry from said geolocation database comprises updating said particular entry from said geolocation database with said review.

23. The method of claim 18, further comprising detecting emotion information indicative of an emotion of said user at initiation of said triggering event, wherein updating said particular entry from said geolocation database comprises applying said emotion information to said particular entry from said geolocation database.

24. The method of claim 18, further comprising, after having updated said particular entry, providing said particular entry to another user in another vehicle.

25. The method of claim 18, wherein detecting initiation of said triggering event comprises detecting interaction with vehicle controls and wherein updating said particular entry comprises updating said entry to indicate slow progress of said vehicle at said vehicle location.

26. The method of claim 18, wherein updating said particular entry from said geolocation database comprises asking for a free-form description of said user's experience at said particular point-of-interest and using sentient detection to translate said free-form description into a sentiment of said user.

27. The method of claim 18, wherein said user is a first user from a plurality of users that comprises said first user and a second user and wherein updating said particular entry from said geolocation database comprises storing a text file containing information provided by said user concerning said particular point-of-interest, said method further comprising reading said text file aloud to said second user, said second user being in a vehicle that differs from said vehicle.

28. The method of claim 18, further comprising causing said geolocation database to aggregate rating information provided by said user and other users.

29. The method of claim 18, wherein enhancing said geolocation database further comprises updating said geolocation database in real-time with information representing said user's vehicle data and user data and with information representing vehicle data and user data from other users.

30. The method of claim 18, wherein said geolocation database is remote from said vehicle.

31. The method of claim 18, wherein updating said particular entry from said geolocation database comprises updating entry that stores a location of a point of interest.

32. The method of claim 18, updating said particular entry from said geolocation database comprises updating an entry that stores reviews of points of interest.

33. The method of claim 18, wherein updating said particular entry from said geolocation database comprises updating an entry that stores an incident report pertaining to a location.

34. The method of claim 18, wherein said user is one of a plurality of users and wherein enhancing said geolocation database comprises updating said geolocation database based on triggering events initiated by each of said users.

* * * * *